(12) United States Patent
Miller et al.

(10) Patent No.: US 12,735,993 B2
(45) Date of Patent: Sep. 15, 2026

(54) SYSTEM AND METHOD FOR OVERSPEED DETECTION AND PROTECTION IN AN ENGINE

(71) Applicant: General Electric Company, Evendale, OH (US)

(72) Inventors: Brandon W. Miller, Liberty Township, OH (US); Arthur W. Sibbach, Boxford, MA (US); Andrew Hudecki, Milford, OH (US); Patrick S. Sage, West Chester, OH (US); Eric Barre, Cincinnati, OH (US); Stefan Joseph Cafaro, Chapel Hill, NC (US); Gerardo Perez Perez, Queretaro (MX); Kevin Graziano, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/883,919

(22) Filed: Sep. 12, 2024

(65) Prior Publication Data

US 2025/0109695 A1 Apr. 3, 2025

Related U.S. Application Data

(60) Provisional application No. 63/541,010, filed on Sep. 28, 2023.

(51) Int. Cl.

| | |
|---|---|
| ***F01D 21/02*** | (2006.01) |
| ***F01D 21/00*** | (2006.01) |
| ***F02C 9/50*** | (2006.01) |

(52) U.S. Cl.

CPC .......... *F01D 21/02* (2013.01); *F01D 21/003* (2013.01); *F02C 9/50* (2013.01); *F05D 2270/021* (2013.01); *F05D 2270/304* (2013.01)

(58) Field of Classification Search

CPC ............ F01D 21/003; F05D 2270/304; F05D 2270/02; F05D 2270/309

See application file for complete search history.

(56) References Cited

U.S. PATENT DOCUMENTS

| | | |
|---|---|---|
| 6,895,325 B1 | 5/2005 | Munson, Jr. |
| 7,036,318 B1 | 5/2006 | Munson, Jr. |
| 7,100,378 B2 | 9/2006 | Matthews |
| 7,424,360 B1 | 9/2008 | Munson, Jr. |

(Continued)

*Primary Examiner* — Eldon T Brockman

(74) *Attorney, Agent, or Firm* — Smith Gambrell & Russell LLP

(57) ABSTRACT

An engine includes a gearbox coupled to a first element and a second element. The engine may include a first speed sensor positioned on an input side of the gearbox, the first speed sensor operable to detect a first speed of the first element. The engine may further include a second speed sensor positioned on an output side of the gearbox, the second speed sensor operable to detect a second speed of the second element. The engine includes a controller comprising a processor and a memory coupled to the processor. The processor may be configured to receive data from the first speed sensor and the second speed sensor. The processor is also configured to detect a trigger event based on the data from the first speed sensor and the data from the second speed sensor. Upon detecting the trigger event, the processor communicates a command to an engine operational system.

20 Claims, 8 Drawing Sheets

(56) References Cited

U.S. PATENT DOCUMENTS

| | | | | |
|---|---|---|---|---|
| 9,470,152 | B2 | 10/2016 | MacDonald | |
| 10,316,689 | B2 | 6/2019 | Fletcher | |
| 10,465,554 | B2 | 11/2019 | MacDonald | |
| 11,015,480 | B2 | 5/2021 | Waun | |
| 11,401,825 | B2 | 8/2022 | Calderon | |
| 11,619,139 | B1 * | 4/2023 | Beauchesne-Martel | F16C 3/02 60/39.091 |
| 11,739,656 | B2 * | 8/2023 | Calderon | F01D 21/045 701/100 |
| 11,898,456 | B2 * | 2/2024 | Calderon | F01D 21/04 |
| 2018/0163640 | A1 * | 6/2018 | Dubreuil | F01D 21/045 |
| 2020/0131918 | A1 | 4/2020 | Calderon | |
| 2021/0095602 | A1 * | 4/2021 | Calderon | F02C 9/26 |
| 2021/0301679 | A1 * | 9/2021 | Calderon | F01D 21/045 |
| 2022/0275763 | A1 * | 9/2022 | Calderon | F01D 17/06 |
| 2023/0358127 | A1 * | 11/2023 | Tian | F01D 21/006 |
| 2023/0407761 | A1 * | 12/2023 | Sibbach | F02C 9/50 |

* cited by examiner

Determine A Relationship Between The First Speed And The Second Speed ~602

↓

Determining On A Rate Of Change Of The Relationship ~604

↓

Detect A Trigger Event Based On Relationship Exceeding A Rate Of Change Of The Relationship Exceeding A Threshold ~606

SYSTEM AND METHOD FOR OVERSPEED DETECTION AND PROTECTION IN AN ENGINE

CROSS-REFERENCE TO RELATED APPLICATION(S)

This application claims the benefit of U.S. Provisional Application No. 63/541,010 filed Sep. 28, 2023, which is incorporated herein by reference in its entirety.

TECHNICAL FIELD

These teachings relate generally to overspeed detection and protection in engines such as gas turbine engines.

BACKGROUND

Engines in general and aircraft engines may have gearboxes that regulate speeds between different elements in the engine. Failure of the gearbox or elements coupled thereto may result in an overspeed condition, which may damage the engine or components thereof if left uncontrolled.

BRIEF DESCRIPTION OF DRAWINGS

Various needs are at least partially met through provision of the approaches that detect and control overspeed in an engine as described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
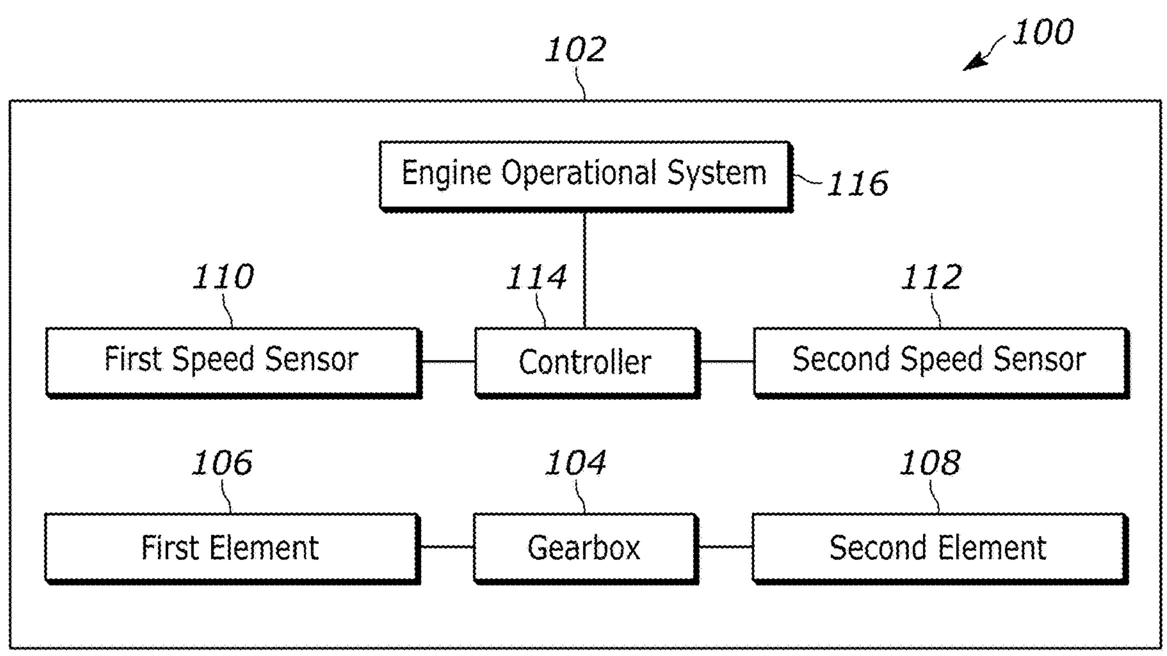
FIG. 1 is a block diagram of a system for detecting overspeed of an engine shaft in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches provided herein use speed sensors positioned on an input and output side of a gearbox to detect overspeed of an engine shaft and limit or stop fuel supply to the engine or control other operational aspects of the engine to prevent overspeed events. An engine is overspeed condition when its rotational speed exceeds its design speed limit, beyond which the operation of the engine can become unsafe. The approaches described herein can be applied to all types of aircraft engines including jet aircraft engines of all types and configurations, rotor craft (e.g., helicopter) engines, or any other type of aircraft engine. In some aspects, the approaches provided herein are applied to commercial turbofan engines and attempt to prevent or otherwise respond to overspeed conditions in an engine by controlling fuel flow, blade pitch, or combinations of these systems or any other aircraft systems.

Aircraft and other engines typically have gearboxes. Engines may include overspeed monitoring and protection in the event of the failure of the gearbox or a shaft coupled thereto. Traditional overspeed monitoring and protection may involve monitoring the speed of one shaft and may determine or detect overspeed upon the one shaft reaching a particular speed. Such traditional approaches may lead to an oversizing of disks to avoid burst, which adds to engine weight and fuel burn. The approaches described herein detect an imminent overspeed condition (e.g., speed of rotation approach design limit) by monitoring a first speed of a first element coupled to an input side of a gearbox and a second speed of a second element coupled to the output side of the gearbox. A divergence between the first speed and the second speed may act as a trigger event that causes a controller to stop or slow the engine or otherwise respond to the trigger event. The trigger event may be any divergence of a known relationship between the first speed and the second speed and may be indicative of an overspeed condition. In this manner, an actual overspeed condition does not need to be sensed, but rather a divergence between the first speed and the second speed is detected. Advantageously, the approaches described herein may detect and respond to overspeed conditions more quickly than traditional approaches.

The foregoing and other benefits may become clearer upon making a thorough review and study of the following detailed description.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Referring now to FIG. 1, an example of a system 100 that senses and reacts to excessive speed in an engine is described. The system 100 includes an engine 102. The engine 102 includes a gearbox 104 coupled to a first element 106 and a second element 108. The gearbox 104 has an input side that includes an input shaft and an output side that includes an output shaft. The first element 106 is disposed on the input side of the gearbox 104 and is coupled to a power source. The first element 106 may be, for example, the input shaft of the gearbox 104 or a component coupled thereto. The second element 108 is disposed on an output side of the gearbox 104 and receives rotational energy from the input shaft of the gearbox. The second element 108 may be, for example, the output shaft of the gearbox 104 or a component coupled thereto. The gearbox 104 regulates speed between the first element 106 and the second element 108. A first speed sensor 110 is disposed on the input side of the gearbox 104. The second speed sensor 112 is disposed on the output side of the gearbox 104.

The engine 102 may be any type of aircraft engine, such as a ducted or unducted aircraft engine. In some aspects, the engine 102 may be a gas turbine engine for an aircraft. The gearbox 104 may be any type of gearbox. In some aspects, the gearbox 104 is the power gearbox of a gas turbine engine. In some aspects, the engine 102 is a turboshaft engine for a rotorcraft such as a helicopter and the gearbox 104 is the main gearbox for the rotocraft. The gearbox 104 may be mounted to any aircraft component in any suitable manner or using any suitable structure. For example, the gearbox 104 may be mounted about a shaft of the engine 102. It will be appreciated that any gearbox mounting structure or approach described herein is an example and that other examples are possible.

The first element 106 and the second element 108 may be any type of engine part, assembly, structure, machine, or other element. In one example, the first element 106 is the high-speed shaft of a gas turbine engine. In another example, the first element 106 is a component coupled to the high-pressure shaft of a gas turbine engine, such as the high-pressure turbine. In one example, the second element 108 is the low-speed shaft of a gas turbine engine. In another example, the second element 108 is a component coupled to the low-pressure shaft of a gas turbine engine. Each of the elements may in turn have sub-elements or sub-components. The high-pressure turbine may be coupled to the gearbox 104 by a rotating shaft (e.g., the input shaft of the gearbox 104). The gearbox 104 is coupled to the fan blades by various mechanical arrangements such as shafts (e.g., the output shaft of the gearbox 104) and gears. It will be appreciated that although much of the disclosure herein is described in terms of coupling the gearbox 104 between fan blades and the high-pressure turbine, the gearbox 104 may be coupled to other aircraft elements as well.

The first speed sensor 110 and the second speed sensor 112 are operable to measure speed. The first speed sensor 110 and the second speed sensor 112 may be any type of sensor that is used to measure speed. In some examples, one or more of the first speed sensor 110 and the second speed sensor 112 may be a variable reluctance sensor (e.g., a gear-based sensor), a surface acoustic wave sensor (SAW) sensor, a blade beta angle sensor, a speed sensor measuring speed from an electric machine, or a torque sensor measuring torque from an electric machine.

The first speed sensor 110 is positioned on the input side of the gearbox 104. The first speed sensor 110 measures the speed of the first element 106. In some approaches, the first speed sensor 110 is mounted on or in the vicinity of the second element 108 or a component coupled thereto. In one example, the first speed sensor 110 may be mounted to the frame or some other non-moving or non-rotating component of the engine 102. The mounting position of the first speed sensor 110 may depend on the type of sensor employed. For example, a SAW sensor may include elements disposed on the input shaft of the gearbox 104 with an antenna mounted to a nearby frame or bearing support. As another example, a variable reluctance sensor may be inserted through an opening in a frame such that the sensor tip is located in the proximity of a toothed wheel that is coupled to the input shaft of the gearbox 104.

In one example, the first speed sensor 110 is a variable reluctance sensor that is gear-based and is mounted on the input shaft of the gearbox 104. Such a variable reluctance sensor may consist of two or more gears, for example, an input gear that is coupled to the input shaft of the gearbox 104 and an output gear that is coupled to a sensor mechanism of the variable reluctance sensor. The input gear rotates at the same speed as the input shaft and, also, rotates the output gear. The sensor mechanism of the variable reluctance sensor detects the movement of the output gear and generates an electrical signal that is proportional to the speed of the input shaft. The sensor mechanism of the variable reluctance sensor may be, for example, a magnetic or optical sensor mechanism.

The second speed sensor 112 is positioned on the output side of the gearbox 104. The second speed sensor 112 measures the speed of the second element 108. In some approaches, the second speed sensor 112 is mounted on or in the vicinity of the second element 108 or a component coupled thereto. In one example, the second speed sensor 112 may be mounted to the frame or some other non-moving or non-rotating component of the engine 102.

In one example, the second speed sensor 112 is a variable reluctance sensor that is gear-based and is mounted on the output shaft of the gearbox 104. Such a variable reluctance sensor may consist of two or more gears, for example, an input gear that is coupled to the output shaft of the gearbox 104 and an output gear that is coupled to a sensor mechanism of the variable reluctance sensor. The input gear rotates at the same speed as the output shaft and, also, rotates the output gear. The sensor mechanism of the variable reluctance sensor detects the movement of the output gear and generates an electrical signal that is proportional to the speed of the output shaft of the gearbox 104.

In some embodiments, the first speed sensor 111 may be one of sensors 1180, 1180', or 1180" shown in FIGS. 11-13 and the second speed sensor 112 may be one of 1182 or 1182') shown in FIGS. 11-13 and described hereinafter.

The controller 114 may be any type of electronic device that executes electronic computer instructions such as a processor, microcontroller, or the like. The controller 114 may have a memory coupled to the processor that stores programmed instructions to execute the various algorithms and functions described herein.

The controller 114 may be configured to receive and process electrical signals generated by the first speed sensor 110 and the second speed sensor 112. In some approaches, the controller 114 may be configured to analyze the electrical signals from the first speed sensor 110 and the second speed sensor 112 to detect a trigger event. The trigger event may be any event that is indicative of an overspeed condition of the engine 102. In one example, if the trigger event may be a deviation between a known or expected relationship between a speed of the first element 106 (e.g., as detected by the first speed sensor 110) and a speed of the second element 108 (e.g., as detected by the second speed sensor 112). In another example, the trigger event is when a difference between the speed of the first element 106 and a speed of the second element 108 exceeds a threshold value. In yet another example, the trigger event is when a rate of change between the speed of the first element 106 and a speed of the second element 108 exceeds a threshold value.

In some approaches, the controller 114 may be configured to transmit or communicate a command to control operation of the engine 102. For example, the controller 114 may communicate a command to one or more engine operational systems 116.

The engine operational system 116 may be any system that controls the engine 102 or, in some examples, an aircraft that is powered by the engine 102. For example, the one or more engine operational systems 116 may include systems that control fuel flow to the engine 102, change the pitch of fan blades of the engine 102, bleed compressor discharge air overboard so as to not provide flow to the turbine, etc. The one or more engine operational systems 116 may include devices such as shafts, gears, valves, arms, motors, or other components that are controlled by control systems and which may be operated by the controller 114, for example, by receiving commands from the controller 114.

In operation, as described elsewhere herein, the first speed sensor 110 measures the speed of the first element 106 (e.g., a first speed) and the second speed sensor 112 measures the speed of the second element 108 (e.g., a second speed). The measured speeds of the first element 106 and the second element 108 are analyzed by the controller 114 to detect or predict an overspeed condition of the engine 102. The controller 114 may communicate a command to one or more engine operational systems 116 to respond to or prevent an overspeed condition of the engine 102 based on the measured speeds and, in some examples, a relationship between the measured speeds.

Figure 2:
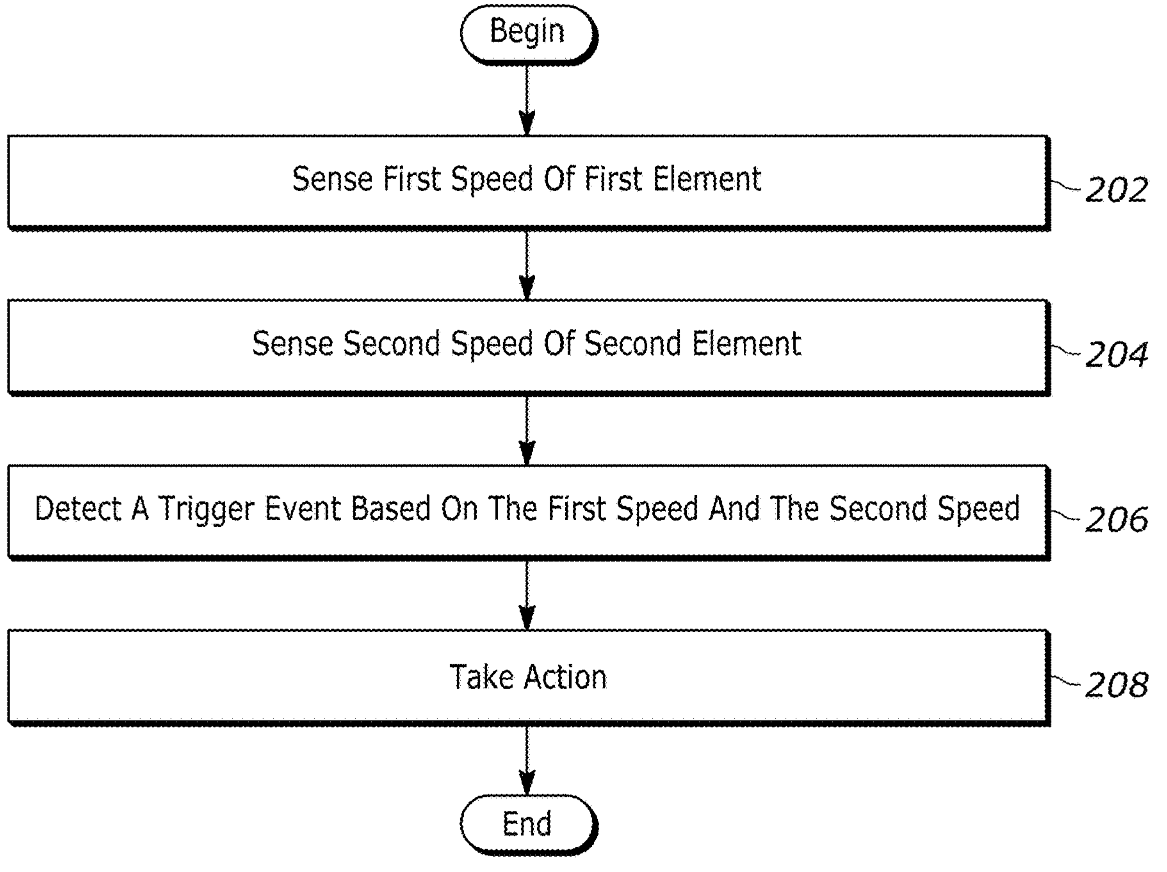
FIG. 2 is a flow diagram of an approach for detecting an overspeed condition of the engine in accordance with various embodiments of these teachings.

Referring now to FIG. 2, one example of an approach for monitoring and controlling overspeed in an engine is provided. The engine may be the engine 102 shown in and described with reference to FIG. 1. In some examples, the engine is the turbine engine 1110 shown in and described with reference to FIG. 11. Though, it is contemplated that the approaches may be employed in any number of suitable engines configurations.

At block 202, a first speed sensor senses a first speed of a first element of the engine. The first speed sensor is positioned on an input side of a gearbox of the engine. In some examples, the first element is the first element 106 described with reference to FIG. 1 and the first speed sensor is the first speed sensor 110.

At block 204, a second speed sensor senses a second speed of a second element of the engine. The second speed sensor is positioned on the output side of the gearbox of the engine. In some examples, the second element is the second element 108 described with reference to FIG. 1 and the second speed sensor is the second speed sensor 112.

At block 206, a controller detects a trigger event based on the first speed and the second speed. The trigger event may be, for example, any deviation between a known or expected relationship between the first speed and the second speed. In one example, the trigger event is when a difference between the first speed and the second speed exceeds a threshold value. In another example, the trigger event is when a rate of change between the first speed and the second speed exceeds a threshold value. The controller may detect the trigger event using one or more of the approaches described here. Various approaches for detecting the trigger event are described with reference to FIGS. 3-10. In some examples, the controller may be the controller 114 described with reference to FIG. 1.

At block 208, the controller takes action upon detecting the trigger event. The controller may take action by communicating a command to trigger an action in one or more of the engine operational systems. For example, the controller may control or adjust one or more of the engine operational systems 116 described with reference to FIG. 1. The action may be to stop or slow the engine. In one example, the action may be to stop or decrease fuel supply or flow to the engine to stop or slow the engine. In another example, the action may be to operate a valve that dumps compressor discharge air pressure overboard so that no (or reduced) air flow is provided to the turbine. In yet another example, the action may be to adjust or close a variable turbine inlet vane to adjust or shut off air flow to the turbine. The action may also be to change the pitch of fan blades. In one example, the command may be configured to slow down or shut down the engine upon detecting the trigger event. In another example, the command may be configured to adjust operation of one or more systems of an aircraft that is powered by the engine. For example, the command may be configured to stop fuel supply to the engine, operate a valve that dumps compressor discharge air pressure, or operate a variable turbine inlet vane to control air flow to a turbine of the engine.

Referring now to FIGS. 3-10, various approaches for detecting a trigger event based on the first speed of the first element and the second speed of the second element are described. The approaches described with reference to FIGS. 3-10 may be executed using a controller. In one example, the approaches are executed using the controller 114 described with reference to FIG. 1, though, it is contemplated that other suitable control devices may be used. Upon detecting the trigger event, the controller 114 may trigger one or more of an alert, a warning, an adjustment to one or more engine operational systems 116, or any other automatic system action.

As explained above, the first speed of the first element and the second speed of the second element are related through a gearbox, such as the gearbox 104 described with reference to FIG. 1. The gearbox, for example, may include gears with a specific reduction ratio that reduces the first speed of the first element (e.g., a high-speed input to the gearbox) to the second speed of the second element (e.g., a desired low-speed output). The approaches described herein may leverage the known relationship of the first speed and the second speed to detect abnormal operating conditions, such as overspeed conditions, of the engine.

Figure 3:
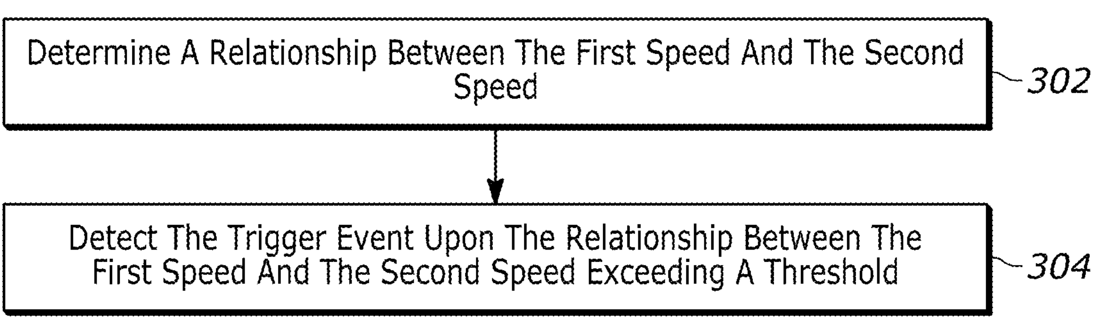
FIG. 3 is a flow diagram showing an approach for detecting overspeed, according to an embodiment of the present disclosure.

Turning first to FIG. 3, one exemplary approach detecting a trigger event based on the first speed of the first element and the second speed of the second element is provided.

At block 302, a controller determines a relationship between the first speed of the first element and the second speed of the second element. In one example, the controller 114 may determine the relationship between the first speed and the second speed. The controller 114 may receive the first speed from the first speed sensor 110. The controller 114 may receive the second speed from the second speed sensor 112.

In one example, the relationship between the first speed and the second speed may be a ratio of the first speed to the second speed. In another example, the relationship is a difference between the first speed and the second speed. Though, it is contemplated that the approach may use any relationship or value correlating the first speed to the second speed.

At block 304, the controller detects the trigger event upon the relationship between the first speed of the first element and the second speed of the second element exceeding a threshold. In one example, the controller 114 may detect the trigger event upon the relationship between the first speed and the second speed exceeding a threshold. The threshold may be based on a known relationship between the first speed of the first element and the second speed of the second element. The known relationship may be set, for example, by the gearbox or reduction ratio defined by gears in the gearbox that couples the first element to the second element. In some non-limiting examples, the gearbox ratio may be between about 2.0 and about 5.0, for example, for a ducted engine. In another non-limiting example, the gearbox ratio may be between about 5 and about 15, for example, for an open rotor engine. In one example, the threshold for the relationship between the first speed of the first element and the second speed of the second element may be between about 1% and about 10% of rated speed, between about 1% and about 5% of rated speed, or, in some examples, between about 1% and about 2% of rated speed.

It is to be understood that "exceeding," as used herein, may encompass any value that goes beyond the threshold and may include going above or below the threshold. Further, the threshold may be one or more values and, for example, may include one or more of an upper limit and lower limit that define a normal operating range for one or more of the first speed and the second speed.

Figure 4:
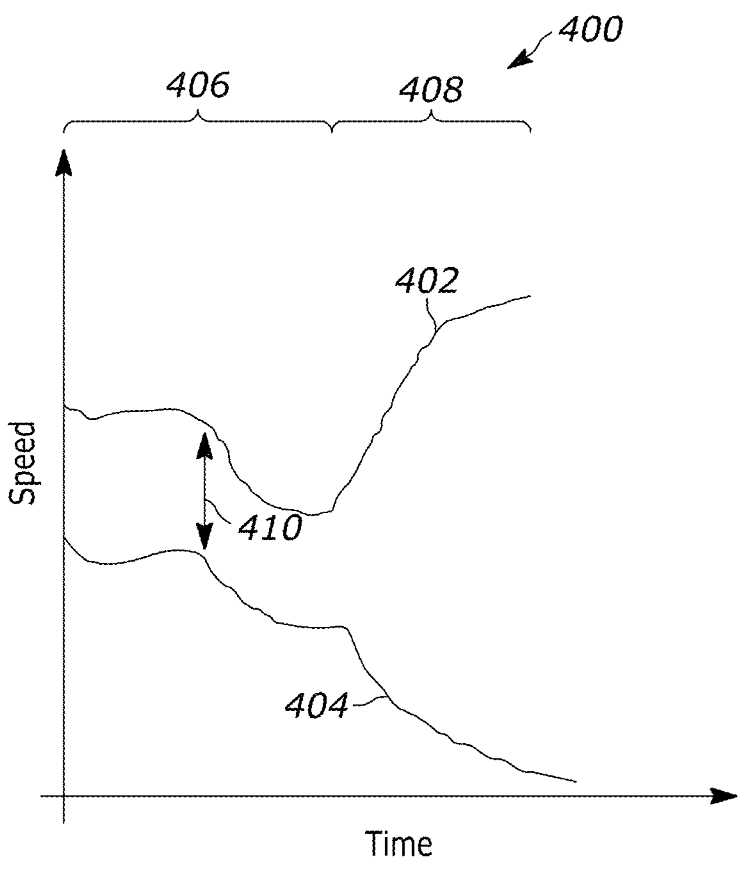
FIG. 4 is a diagram showing an approach for detecting overspeed, according to an embodiment of the present disclosure.

FIG. 4 is a graph 400 showing the first speed 402 of the first element and the second speed 404 of the second element over time. The first speed 402 and the second speed 404 have a relationship 410. The graph 400 includes a first region 406 and a second region 408.

The first region 406 shows the relationship 410 during normal operation. In the first region 406, the relationship 410 falls within a known or expected range. One or more threshold values may define the known or expected range for the relationship 410 during normal operation. For example, in the first region 406, the relationship 410 may be within a threshold and/or acceptable range, as determined by exceedance limits, for the relationship 410.

The second region 408 shows a trigger event where there is a divergence in the relationship 410. The trigger event may, for example, be indicative of an engine overspeed condition. The trigger event may be at any point in the second region 408 where the relationship 410 falls outside the expected range. In the second region 408, the relationship 410 exceeds one or more threshold values. That is, in the relationship 410 exceeds or otherwise falls outside the known or expected range. For example, in the second region 408, the relationship 410 may exceed a threshold, such as an exceedance limit for the relationship 410.

Upon determining that the relationship 410 exceeds a threshold, the controller detects the trigger event and may take any suitable action, for example, by communicating an alert, alarm, or one or more commands to an engine operational system. The command may, for example, bring the relationship 410 within or below the threshold. In another example, the command may stop the engine.

Figures 5, 6:
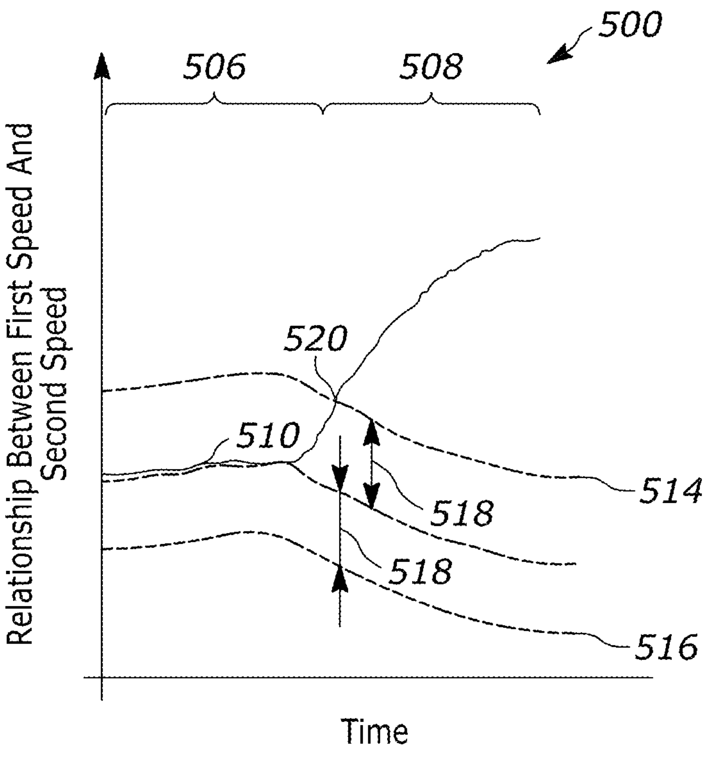
FIG. 5 is a diagram showing an approach for detecting overspeed, according to an embodiment of the present disclosure.
FIG. 6 is a flow diagram showing an approach for detecting overspeed, according to an embodiment of the present disclosure.

FIG. 5 is another graph 500 showing a relationship 510 between the first speed of the first element and the second speed of the second element over time. The graph 500 shows an upper exceedance limit 514 and a lower exceedance limit 516 for the relationship 510. One or more of the upper exceedance limit 514 and the lower exceedance limit 516 may be defined based on one or more of a margin, buffer, or error tolerance that establishes an acceptable range for the relationship 510 or otherwise defines a normal range for the relationship 510 during normal engine operation. The graph 500 includes a first region 506 and a second region 508.

The first region 506 shows the relationship 510 during normal operation. In the first region 506, the relationship 510 falls within the upper exceedance limit 514 and the lower exceedance limit 516 which indicates that the relationship 510 is within the known or expected range.

The second region 508 shows a trigger event where there is a divergence in the relationship 510. The trigger event may, for example, be indicative of an engine overspeed condition. The trigger event may be at any point in the second region 508 where the relationship 510 falls outside the expected range. In the second region 508, the relationship 510 exceeds the upper exceedance limit 514. That is, in the second region 508, exceeds or otherwise falls outside the known or expected range.

Point 520 on the graph 500 shows the point at which the controller may detect the trigger event. At point 520, the relationship 510 begins to exceed the upper exceedance limit 514. Thus, upon the relationship 510 reaching point 520 or at any point thereafter, the controller may take an action, such as to communicate a command to one or more engine operational systems to respond to the trigger event. The command may, for example, bring the relationship 510 within or below the threshold (e.g., within or between the upper exceedance limit 514 and the lower exceedance limit 516). In another example, the command may stop the engine.

Turning now to FIG. 6, another exemplary approach for detecting a trigger event based on the first speed of the first element and the second speed of the second element is provided.

At block 602, the controller determines a relationship between the first speed of the first element and the second speed of the second element. In one example, the controller 114 may determine the relationship between the first speed and the second speed. The controller 114 may receive the first speed from the first speed sensor 110. The controller 114 may receive the second speed from the second speed sensor 112.

In one example, the relationship between the first speed and the second speed may be a ratio of the first speed to the second speed. In another example, the relationship is a difference between the first speed and the second speed. Though, it is contemplated that approach may use any relationship or value correlating the first speed to the second speed.

At block 604, the controller determines a rate of change of the relationship between the first speed of the first element and the second speed of the second element. In one example, the controller 114 determines the rate of change of the relationship.

At block 606, the controller detects the trigger event upon the rate of change of the relationship between the first speed of the first element and the second speed of the second element exceeding a threshold. In one example, the controller 114 may detect the trigger event upon the relationship between the first speed and the second speed exceeding a threshold.

Figure 7:
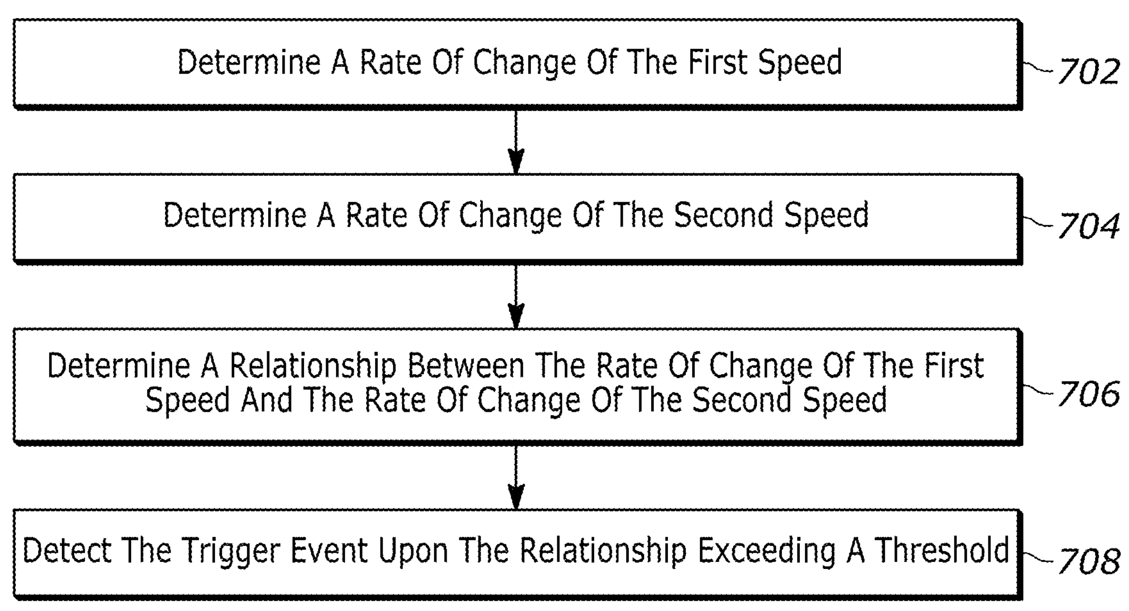
FIG. 7 is a flow diagram showing an approach for detecting overspeed, according to an embodiment of the present disclosure.

Turning now to FIG. 7, another exemplary approach for detecting a trigger event based on the first speed of the first element and the second speed of the second element is provided.

At block 702, a controller determines a rate of change of the first speed of the first element. In one example, the controller 114 described with reference to FIG. 1 may determine the rate of change of the first speed. The controller 114 may receive the first speed from the first speed sensor 110.

At block 704, the controller determines the rate of change of the second speed of the second element. In one example, the controller 114 described with reference to FIG. 1 may determine the rate of change of the second speed. The controller 114 may receive the second speed from the second speed sensor 112.

At block 706, the controller determines a relationship between the rate of change of first speed and the rate of change of the second speed of the second element. In one example, the controller 114 may determine the relationship between the rate of change first speed and rate of change of the second speed.

In one example, the relationship between the rate of change of the first speed and the rate of change of the second speed may be a ratio of the rate of change of first speed to rate of change of the second speed. In another example, the relationship is a difference between the rate of change of the first speed and the rate of change of the second speed. Though, it is contemplated that approach may use any relationship or value correlating the first speed to the second speed.

At block 708, the controller detects the trigger event upon the relationship between the rate of change of the first speed and the rate of change of the second speed exceeding a threshold. In one example, the controller 114 may detect the trigger event upon the relationship between the rate of change of the first speed and the rate of change of the second speed exceeding a threshold. In one non-limiting example, the threshold for the difference in the rate of change of the first speed and the rate of change of the second speed may be between about 1% per second and about 10% per second, between about 3 and about 7% per second, or, in some aspects, about 5% per second (wherein the percents (%) are percent of rated speed).

Figure 8:
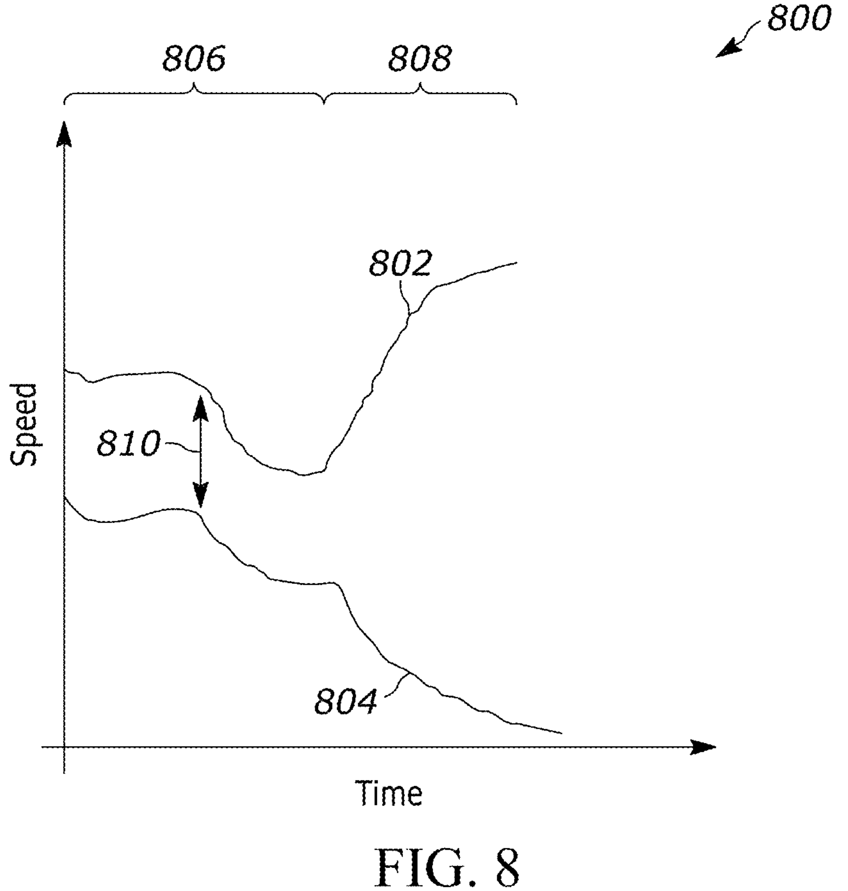
FIG. 8 is a diagram showing an approach for detecting overspeed, according to an embodiment of the present disclosure.

FIG. 8 is a graph 800 showing the rate of change of first speed 802 of the first element (e.g., the acceleration of the first element) and the rate of change of the second speed 804 of the second element (e.g., the acceleration of the second element) over time. The rate of change of the first speed 802 and the rate of change of the second speed 804 have a relationship 810. The graph 800 includes a first region 806 and a second region 808.

The first region 806 shows the relationship 810 during normal operation. In the first region 806, the relationship 810 falls within a known or expected range. One or more threshold values may define the known or expected range for the relationship 810 during normal operation. For example, in the first region 806, the relationship 810 may be within a threshold and/or an expected range, for example, as defined by one or more exceedance limits for the relationship 810.

The second region 808 shows the relationship 810 during a trigger event. In the second region 808, the relationship 810 exceeds one or more threshold values. That is, the relationship 810 exceeds or otherwise falls outside the known or expected range. For example, in the second region 808, the relationship 810 may exceed a threshold and/or falls outside an expected range, for example, as defined by one or more exceedance limits for the relationship 810.

Upon determining that the relationship 810 exceeds a threshold, the controller detects the trigger event and may take any suitable action, for example, by communicating an alert, alarm, or one or more commands to an engine operational system.

Figure 9:
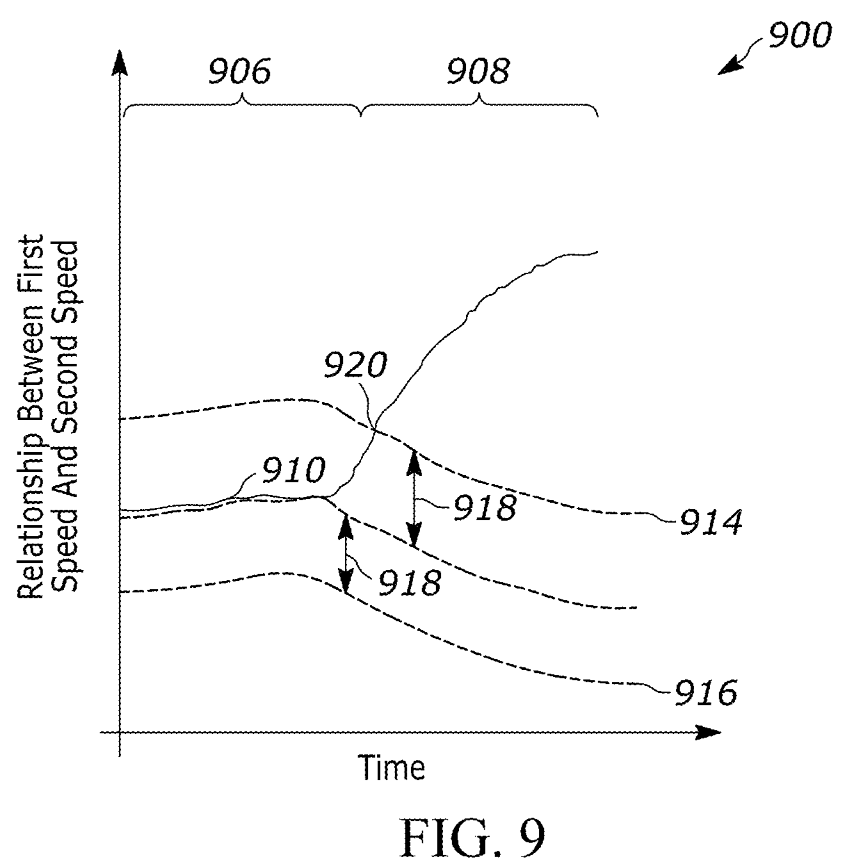
FIG. 9 is a diagram showing an approach for detecting overspeed, according to an embodiment of the present disclosure.

FIG. 9 is another graph 900 showing a relationship 910 between the rate of change of the first speed of the first element and the rate of change of the second speed of the second element over time. The graph 900 shows an upper exceedance limit 914 and a lower exceedance limit 916 for the relationship 910. One or more of the upper exceedance limit 914 and the lower exceedance limit 516 may be defined based on one or more of a margin, buffer, or error tolerance that establishes an acceptable range for the relationship 910 or otherwise defines a normal range for the relationship 910 during normal engine operation. The graph 900 includes a first region 906 and a second region 908.

The first region 906 shows the relationship 910 during normal operation. In the first region 906, the relationship 910 falls within the upper exceedance limit 914 and the lower exceedance limit 916 which indicates that the relationship 910 is within the known or expected range.

The second region 908 shows the relationship 910 during a trigger event. In the second region 908, the relationship 910 exceeds the upper exceedance limit 914. That is, in the second region 908, exceeds or otherwise falls outside the known or expected range.

Point 920 on the graph 900 shows the point at which the controller may detect the trigger event. At point 920, the relationship 910 begins to exceed the upper exceedance limit 914. Thus, upon the relationship 910 reaching point 920 or at any point thereafter, the controller may take an action, such as to communicate a command to one or more engine operational systems to respond to the trigger event.

It is contemplated that monitoring a rate of change in the first speed of the first element and a rate of change in the second speed of the second element may be quicker to detect the trigger event than monitoring speed alone. For example, after an event such as an overspeed condition, one shaft may accelerate quicker than expected while the other may decelerate quicker than expected.

Figure 10:
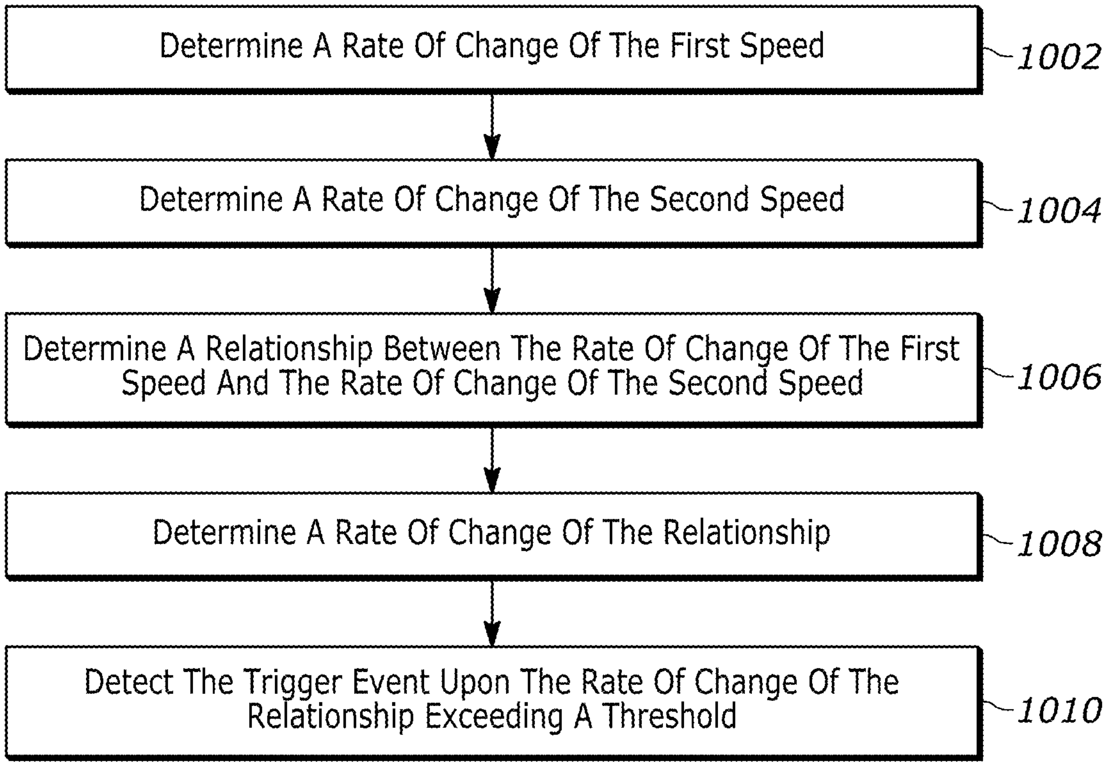
FIG. 10 is a flow diagram showing an approach for detecting overspeed, according to an embodiment of the present disclosure.

Turning now to FIG. 10, another exemplary approach for detecting a trigger event based on the first speed of the first element and the second speed of the second element is provided.

At block 1002, a controller determines a rate of change of the first speed of the first element. In one example, the controller 114 described with reference to FIG. 1 may determine the rate of change of the first speed. The controller 114 may receive the first speed from the first speed sensor 110.

At block 1004, the controller determines a rate of change of the second speed of the second element. In one example, the controller 114 described with reference to FIG. 1 may determine the rate of change of the second speed. The controller 114 may receive the second speed from the second speed sensor 112.

At block 1006, the controller determines a relationship between the rate of change of the first speed of the first element and the rate of change of the second speed of the second element. In one example, the controller 114 may determine the relationship between the rate of change of the first speed and the rate of change of the second speed. The controller 114 may receive the first speed from the first speed sensor 110 and calculate the rate of change. The controller 114 may receive the second speed from the second speed sensor 112 and calculate the rate of change.

In one example, the relationship between the rate of change of the first speed and the rate of change of the second speed may be a ratio of the rate of change of the first speed to the rate of change of the second speed. In another example, the relationship is a difference between the rate of change of the first speed and the rate of change of the second speed. Though, it is contemplated that approach may use any relationship or value correlating the rate of change of the first speed to the rate of change of the second speed.

At block 1008, the controller determines a rate of change of the relationship between the rate of change of the first speed of the first element and the rate of change of the second speed of the second element. In one example, the controller 114 determines the rate of change of the relationship.

At block 1010, the controller detects the trigger event upon the rate of change of the relationship between the rate of change of the first speed of the first element and the rate of change of the second speed of the second element exceeding a threshold. In one example, the controller 114 may detect the trigger event upon the relationship between the rate of change of the first speed and the rate of change of the second speed exceeding a threshold.

In some embodiments, in the approaches described with reference to FIGS. 3-10, there may be multiple trigger events that prompt the controller to take different actions. For example, a first threshold may be indicative of a first trigger event and a second threshold may be indicative of a second trigger event. The first trigger event may be when the controller detects that the relationship between the first speed and the second speed is outside of a normal operation but has not yet reached an overspeed condition in the engine. The first trigger event may be a warning that overspeed conditions may occur. Thus, upon detecting the first trigger event, the controller may send an alarm to warn that overspeed may occur or may take other actions (e.g., slowing down the engine) to prevent the overspeed condition from occurring. The second trigger event may be an ultimate limit that indicates that the overspeed condition is or has occurred. Thus, upon detecting the second trigger event, the controller may take an action to mitigate the overspeed condition (e.g., stopping the engine).

Further, in some embodiments, it is contemplated that the controller (e.g., the controller 114 described with reference to FIG. 1) may also sense or otherwise monitor the first speed of the first element via the first speed sensor (e.g., the first speed sensor 110) to determine whether the first speed exceeds a threshold. Similarly, the controller (e.g., the controller 114 described with reference to FIG. 1) may also sense or otherwise monitor the second speed of the second element via the second speed sensor (e.g., the second speed sensor 112) to determine whether the second speed or exceeds a threshold. In one example, the controller may determine whether one or more of the first speed and the second speed exceeds a threshold (e.g., a negative or positive exceedance limit). In another example, the controller may determine a rate of change in the second speed and determine whether the rate of change of the second speed exceeds a threshold (e.g., a negative or positive exceedance limit). In one approach, one of the first and second speeds may have a negative exceedance limit and the other of the first and second speeds may have a positive exceedance limit.

Figure 11:
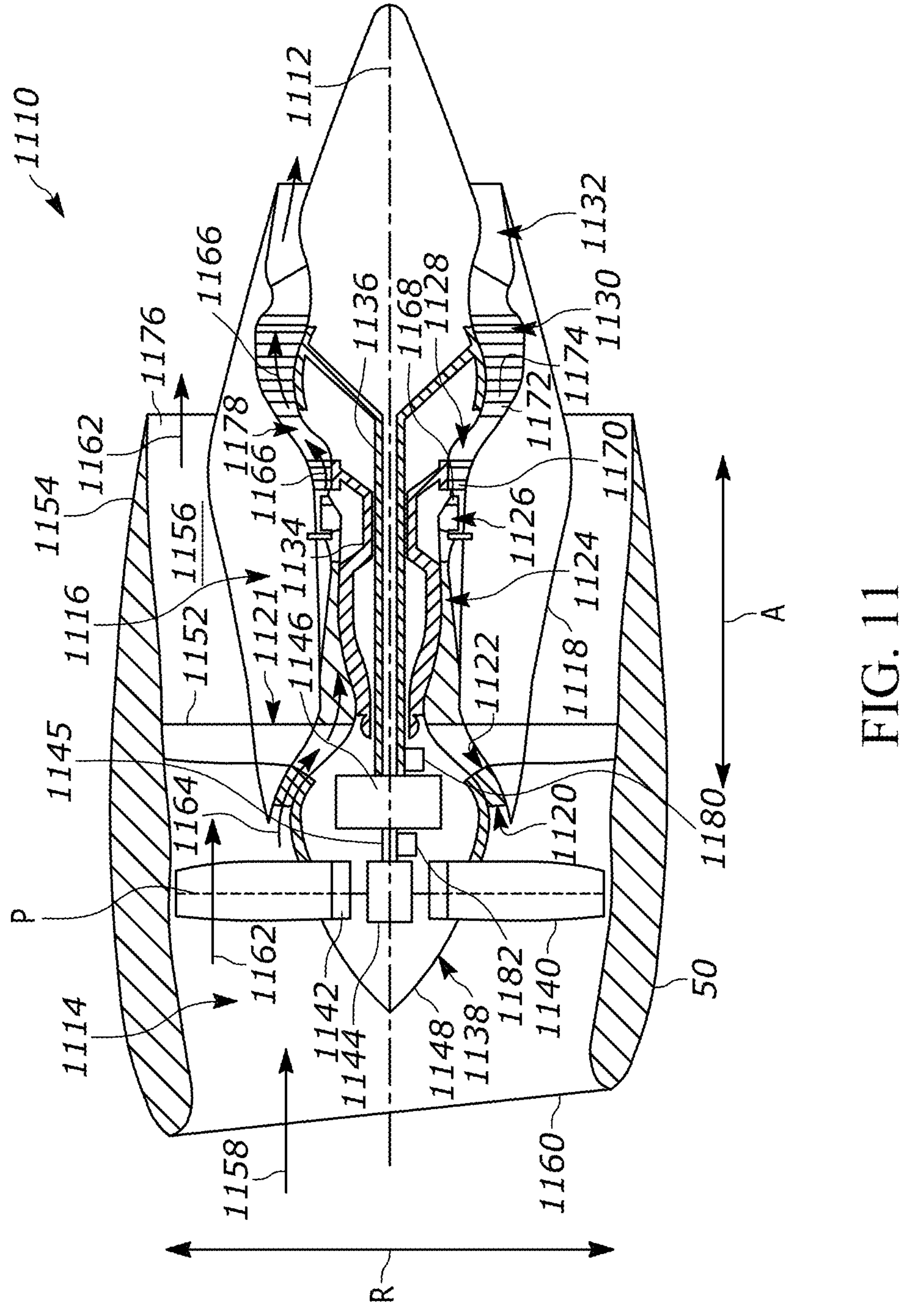
FIG. 11 is a schematic cross-sectional diagram of a turbine engine, taken along an axis of the turbine engine, according to an embodiment of the present disclosure.

FIG. 11 depicts one example of the speed sensors in an engine. FIG. 11 is a schematic cross-sectional diagram of a turbine engine 1110, taken along a centerline axis of the turbine engine 1110, according to an embodiment of the present disclosure. FIG. 11 shows that the turbine engine 1110 defines an axial direction A (extending parallel to a longitudinal centerline 1112 provided for reference) and a radial direction R that is normal to the axial direction A. In general, the turbine engine 1110 includes a fan section 1114 and a core turbine engine 1116 disposed downstream from the fan section 1114.

The core turbine engine 1116 depicted generally includes an outer casing 1118 that is substantially tubular and defines an annular inlet 1120. As schematically shown in FIG. 11, the outer casing 1118 encases, in serial flow relationship, a compressor section 1121 including a booster or a low-pressure (LP) compressor 1122 followed downstream by a high-pressure (HP) compressor 1124, a combustion section 1126, a turbine section including a high-pressure (HP) turbine 1128 followed downstream by a low-pressure (LP) turbine 1130, and a jet exhaust nozzle section 1132. A high-pressure (HP) shaft 1134 or spool drivingly connects the HP turbine 1128 to the HP compressor 1124 to rotate the HP turbine 1128 and the HP compressor in unison. A low-pressure (LP) shaft 1136 drivingly connects the LP turbine 1130 to the LP compressor 1122 to rotate the LP turbine 1130 and the LP compressor 1122 in unison. The compressor section 1121, the combustion section 1126, the turbine section, and the jet exhaust nozzle section 1132 together define a core air flowpath.

The fan section 1114 includes a fan 1138 (e.g., a variable pitch fan) having a plurality of fan blades 1140 coupled to a disk 1142 in a spaced apart manner. As depicted in FIG. 11, the fan blades 1140 extend outwardly from the disk 1142 generally along the radial direction R. Each fan blade 1140 is rotatable relative to the disk 1142 about a pitch axis P by virtue of the fan blades 1140 being operatively coupled to an actuation member 1144 configured to collectively vary the pitch of the fan blades 1140 in unison. The fan blades 1140, the disk 1142, and the actuation member 1144 are together rotatable about the longitudinal centerline 1112 via a fan shaft 1145 that is powered by the LP shaft 1136 across a power gearbox 1146, also referred to as a gearbox assembly 1146. The gearbox assembly 1146 includes a plurality of gears for adjusting the rotational speed of the fan shaft 1145 and, thus, the fan 1138 relative to the LP shaft 1136 to a more efficient rotational fan speed.

Referring still to the exemplary embodiment of FIG. 11, the disk 1142 is covered by a rotatable fan hub 1148 aerodynamically contoured to promote an airflow through the plurality of fan blades 1140. In addition, the fan section 1114 includes an annular fan casing or a nacelle 1150 that circumferentially surrounds the fan 1138 and/or at least a portion of the core turbine engine 1116. The nacelle 1150 is supported relative to the core turbine engine 1116 by a plurality of circumferentially spaced outlet guide vanes 1152. Moreover, a downstream section 1154 of the nacelle 1150 extends over an outer portion of the core turbine engine 1116 to define a bypass airflow passage 1156 therebetween.

During operation of the turbine engine 1110, a volume of air 1158 enters the turbine engine 1110 through an inlet 1160 of the nacelle 1150 and/or the fan section 1114. As the volume of air 1158 passes across the fan blades 1140, a first portion of air 1162 is directed or routed into the bypass airflow passage 1156, and a second portion of air 1164 is directed or is routed into the upstream section of the core air flowpath, or, more specifically, into the annular inlet 1120 of the LP compressor 1122. The ratio between the first portion of air 1162 and the second portion of air 1164 is commonly known as a bypass ratio. The pressure of the second portion of air 1164 is then increased as the second portion of air 1164 is routed through the HP compressor 1124 and into the combustion section 1126, where the highly pressurized air is mixed with fuel and burned to provide combustion gases 1166.

The combustion gases 1166 are routed into the HP turbine 1128 and expanded through the HP turbine 1128 where a portion of thermal and/or of kinetic energy from the combustion gases 1166 is extracted via sequential stages of HP turbine stator vanes 1168 that are coupled to the outer casing 1118 and HP turbine rotor blades 1170 that are coupled to the HP shaft 1134, thus, causing the HP shaft 1134 to rotate, which supports operation of the HP compressor 1124. The combustion gases 1166 are then routed into the LP turbine 1130 and expanded through the LP turbine 1130. Here, a second portion of thermal and kinetic energy is extracted from the combustion gases 1166 via sequential stages of LP turbine stator vanes 1172 that are coupled to the outer casing 1118 and LP turbine rotor blades 1174 that are coupled to the LP shaft 1136, thus, causing the LP shaft 1136 to rotate. This extraction of energy supports operation of the LP compressor 1122 and rotation of the fan 1138 via the gearbox assembly 1146.

A first speed sensor 1180 is disposed on a first side (or input side) the gearbox assembly 1146. In one example, the first speed sensor 1180 may be mounted to the LP shaft 1136. In another example, the first speed sensor 1180 may be mounted at other locations such as on the low-pressure compressor case with a probe that extends to the vicinity of the LP shaft 1136, on a bearing support structure of the LP shaft 1136, on the gearbox assembly 1146, on a structure that is adjacent to the LP shaft 1136, or on or proximal to a component that is coupled to the LP shaft 1136.

The second speed sensor 1182 is disposed on a second side (or output side) of the gearbox assembly 1146. In one example, the second speed sensor 1182 may be mounted to the fan shaft 1145. In another example, the second speed sensor 1182 may be mounted to other locations such as on the engine front frame, on a bearing support structure of the fan shaft 1145, on the gearbox assembly 1146, on a structure that is adjacent to the LP shaft 1136, or on or proximal to a component that is coupled to the fan shaft 1145. In some approaches, other sensors could be deployed near the tips of the blades 1140 to measure blade passes.

The combustion gases 1166 are subsequently routed through the jet exhaust nozzle section 1132 of the core turbine engine 1116 to provide propulsive thrust. Simultaneously, the pressure of the first portion of air 1162 is substantially increased (e.g., 50% to 150%) as the first portion of air 1162 is routed through the bypass airflow passage 1156 before being exhausted from a fan nozzle exhaust section 1176 of the turbine engine 1110, also providing propulsive thrust. The HP turbine 1128, the LP turbine 1130, and the jet exhaust nozzle section 1132 at least partially define a hot gas path 1178 for routing the combustion gases 1166 through the core turbine engine 1116.

The turbine engine 1110 depicted in FIG. 11 is by way of example only. In other exemplary embodiments, the turbine engine 1110 may have any other suitable configuration. For example, in other exemplary embodiments, the fan 1138 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 12:
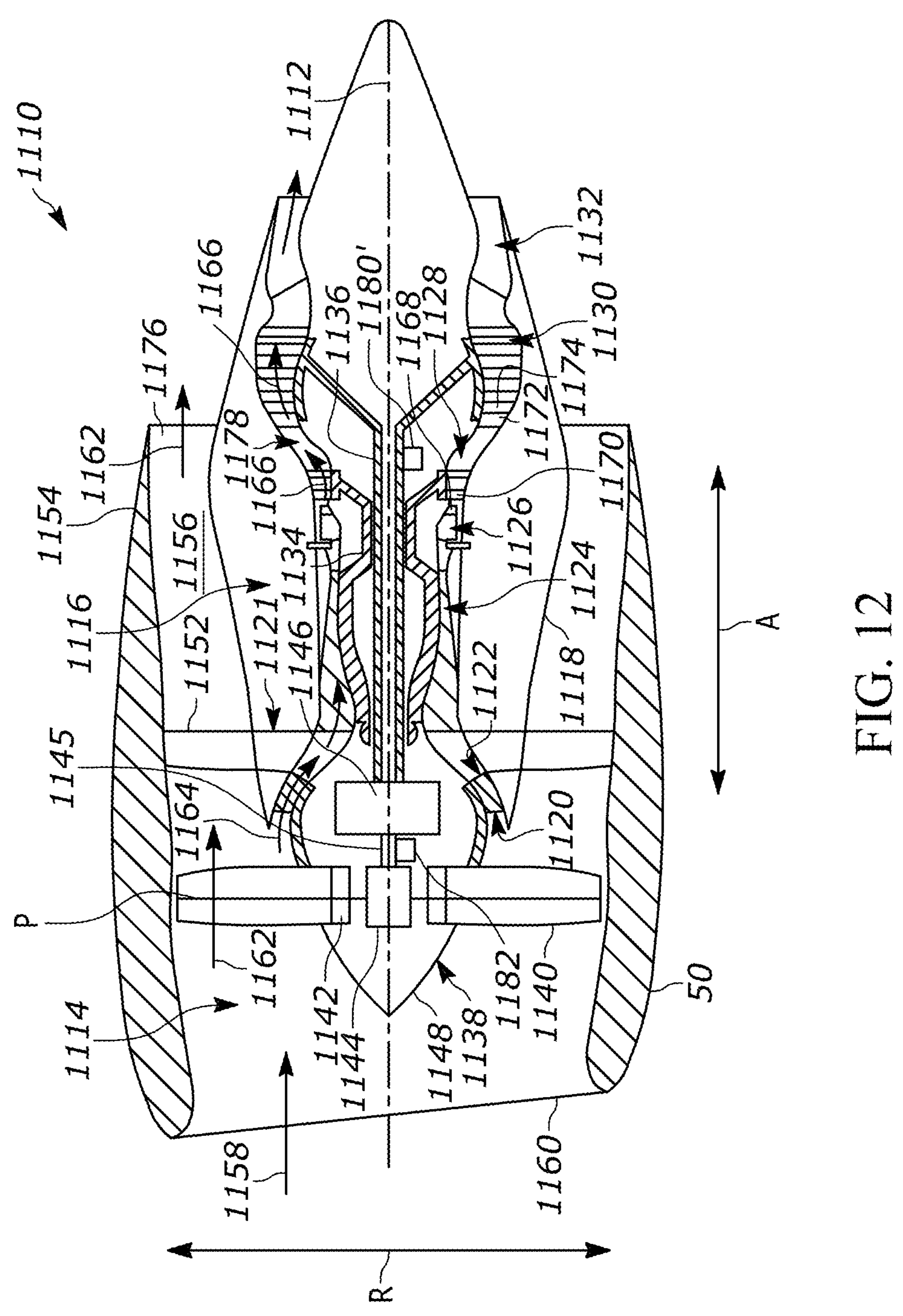
FIG. 12 is a schematic cross-sectional diagram of the turbine engine of FIG. 11, showing an alternative speed sensor placement.

Turning now to FIG. 12, the turbine engine 1110 is shown with an alternative speed sensor placement. In particular, the first speed sensor 1180' is disposed on an aft portion of the LP shaft 1136.

Figure 13:
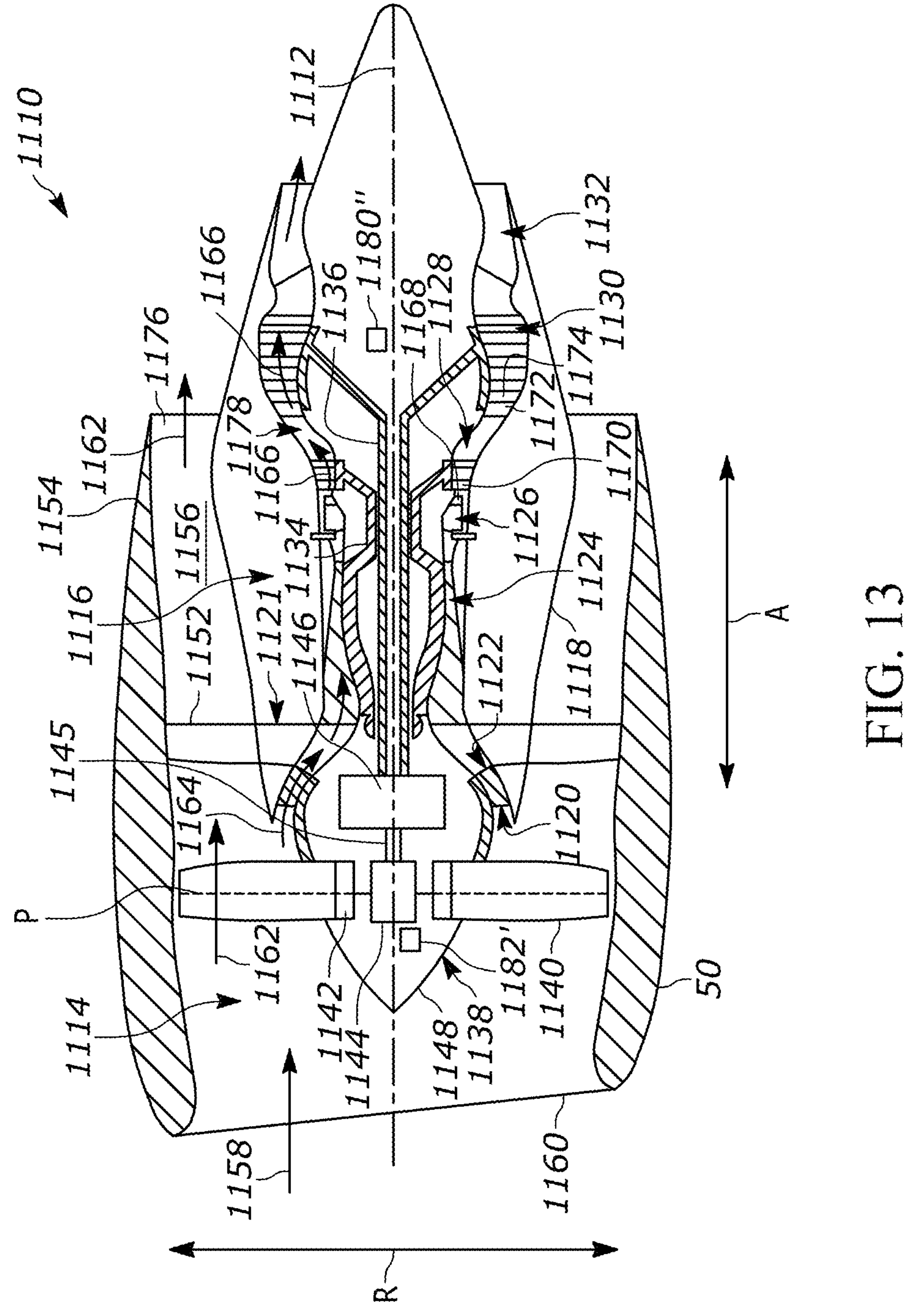
FIG. 13 is a schematic cross-sectional diagram of the turbine engine of FIG. 11, showing an alternative speed sensor placement.

Turning to FIG. 13, the turbine engine 1110 is shown with another alternative speed sensor placement. In particular, the first speed sensor 1180" is disposed on the centerbody of the jet exhaust nozzle section 1132 of the turbine engine 1110. The second speed sensor 1182' is disposed on the fan hub 1148.

It is contemplated that any combination of the configurations of the first speed sensor (1180, 1180', 1180") and the second speed sensor (1182, 1182') shown in FIGS. 11-13 may be employed in the systems and methods described herein.

The systems and methods described herein may be employed to detect an overspeed condition in an engine. By monitoring the speed of a first element coupled to an input side of a gearbox of the engine and the speed of a second element coupled to the output side of the gearbox, an actual overspeed condition does not need to be sensed. Rather, a relationship between the two speeds can be monitored to determine when the two speeds diverge beyond a tolerable threshold. In this manner, it may be possible to detect and respond to imminent overspeed events before an actual overspeed condition occurs. Thus, the approaches described herein may detect and respond to overspeed conditions more quickly than traditional approaches. Instead of waiting for an actual overspeed condition to occur, this method monitors the relationship between the speeds of two elements (input and output sides of the gearbox). By detecting when these speeds diverge beyond a tolerable threshold, it can identify potential overspeed conditions before they happen. Conventional techniques may rely on direct sensing of overspeed conditions. The techniques described herein utilize the relationship between the speeds of different components to allow for earlier detection of anomalies. By identifying imminent overspeed events before they fully develop, the system can respond more quickly, potentially preventing damage or failure that might occur with traditional methods that react only after an overspeed condition is detected.

Further aspects of the disclosure are provided by the subject matter of the following clauses:

A gas turbine engine comprising: a gearbox coupled to a first element and a second element; a first speed sensor positioned on an input side of the gearbox, the first speed sensor operable to detect a first speed of the first element; a second speed sensor positioned on an output side of the gearbox, the second speed sensor operable to detect a second speed of the second element; and a control system comprising a processor and a memory coupled to the processor, the processor configured to: receive data from the first speed sensor; receive data from the second speed sensor; detect a trigger event based on the data from the first speed sensor and the data from the second speed sensor; and upon detecting the trigger event, communicate a command to an engine operational system.

The gas turbine engine of any preceding clause, wherein the first element is an input shaft of the gearbox or a component coupled thereto, and wherein the second element is an output shaft of the gearbox or a component coupled thereto.

The gas turbine engine of any preceding clause, wherein the input shaft is a high-speed shaft, and wherein the output shaft is a low-speed shaft.

The gas turbine engine of any preceding clause, wherein the trigger event is at least one of: exceeding a threshold difference between the first speed and the second speed; or exceeding a threshold rate of change between the first speed and the second speed.

The gas turbine engine of any preceding clause, wherein the command is configured to stop the gas turbine engine.

The gas turbine engine of any preceding clause, wherein the command is configured to stop fuel supply to the gas turbine engine, operate a valve that dumps compressor discharge air pressure, or operate a variable turbine inlet vane to control air flow to a turbine of the gas turbine engine.

The gas turbine engine of any preceding clause, wherein one or more of the first speed sensor or the second speed includes a variable reluctance sensor, a surface acoustic wave (SAW) sensor, a blade beta angle sensor, or an electrical machine.

A control system for a gas turbine engine, the control system comprising: a memory; and a processor coupled to the memory, the processor configured to: receive data from a first speed sensor operable to detect a first speed of a first element coupled to a gearbox of the gas turbine engine, the first speed sensor positioned on an input side of the gearbox; receive data from a second speed sensor operable to detect a second speed of a second element coupled to the gearbox, the second speed sensor positioned on an output side of the gearbox; detect a trigger event based on the data from the first speed sensor and the data from the second speed sensor; and upon detecting the trigger event, communicate a command to an engine operational system.

The control system of any preceding clause wherein the first element is an input shaft coupled to the gearbox or a component coupled thereto, and wherein the second element is an output shaft of the gearbox or a component coupled thereto.

The control system of any preceding clause, wherein the input shaft is a high-speed shaft, and wherein the output shaft is a low-speed shaft.

The control system of any preceding clause, wherein the trigger event is at least one of: exceeding a threshold difference between the first speed and the second speed; or exceeding a threshold rate of change between the first speed and the second speed.

The control system of any preceding clause, wherein the command is configured to stop the gas turbine engine.

The control system of any preceding clause, wherein the command is configured to stop fuel supply to the gas turbine engine.

A method comprising: sensing a first speed of a first element from a first speed sensor positioned on an input side of a gearbox in an engine; receiving data on a second speed of a second element from a second speed sensor positioned on an output side of the gearbox; detecting a trigger event based on the first speed and the second speed; and upon detecting the trigger event, communicating a command to an engine operational system.

The method of any preceding clause, wherein the first element is an input shaft of the gearbox or a component coupled thereto, and wherein the second element is an output shaft of the gearbox or a component coupled thereto.

The method of any preceding clause, wherein the command is configured to stop the engine.

The method of any preceding clause, further including: determining a relationship between the first speed and the second speed; and detecting the trigger event upon the relationship exceeding a threshold.

The method of any preceding clause, further including: determining a rate of change of the first speed; determining a rate of change of the second speed; determining a relationship between the rate of change of the first speed and the rate of change of the second speed; and detecting the trigger event upon the difference exceeding a threshold.

The method of any preceding clause, further including: determining a relationship between the first speed and the second speed; determining a rate of change in the relationship; and detecting the trigger event upon the rate of change in the relationship exceeding a threshold.

The method of any preceding clause, further including: determining a rate of change of the first speed; determining a rate of change of the second speed; determining a relationship between the rate of change of the first speed and the rate of change of the second speed; determining a rate of change of the relationship; and detecting the trigger event upon the rate of change of the relationship exceeding a threshold.

The invention claimed is:

1. A gas turbine engine, comprising:

a gearbox coupled to a first element and a second element;

a first speed sensor positioned on an input side of the gearbox, the first speed sensor operable to detect a first speed of the first element;

a second speed sensor positioned on an output side of the gearbox, the second speed sensor operable to detect a second speed of the second element; and a control system comprising a processor and a memory coupled to the processor, the processor configured to:

receive data from the first speed sensor; receive data from the second speed sensor;

detect a trigger event based on the data from the first speed sensor and the data from the second speed sensor, the trigger event comprising a divergence between the first speed and the second speed that is indicative of an overspeed condition of the gas turbine engine; and upon detecting the trigger event, communicate a command to an engine operational system to operate a valve that dumps compressor discharge air pressure or to operate a variable turbine inlet vane to control air flow to a turbine of the gas turbine engine.

2. The gas turbine engine of claim 1, wherein the first element is an input shaft of the gearbox or a component coupled thereto, and wherein the second element is an output shaft of the gearbox or a component coupled thereto.

3. The gas turbine engine of claim 2, wherein the input shaft is a high-speed shaft, and wherein the output shaft is a low-speed shaft.

4. The gas turbine engine of claim 1, wherein the trigger event is at least one of:

exceeding a threshold difference between the first speed and the second speed; or exceeding a threshold rate of change between the first speed and the second speed.

5. The gas turbine engine of claim 1, wherein the command is configured to stop the gas turbine engine.

6. The gas turbine engine of claim 1, wherein one or more of the first speed sensor or the second speed sensor comprises a variable reluctance sensor, a surface acoustic wave (SAW) sensor, a blade beta angle sensor, or an electrical machine.

7. The gas turbine engine of claim 1, wherein the processor is further configured to:

detect a first trigger event upon the divergence exceeding a first threshold; and detect a second trigger event upon the divergence exceeding a second threshold, wherein the first trigger event prompts the processor to communicate a command to slow the gas turbine engine, and wherein the second trigger event prompts the processor to communicate a command to stop the gas turbine engine.

8. A control system for a gas turbine engine, the control system comprising:

a memory; and a processor coupled to the memory, the processor configured to:

receive data from a first speed sensor operable to detect a first speed of a first element coupled to a gearbox of the gas turbine engine, the first speed sensor positioned on an input side of the gearbox;

receive data from a second speed sensor operable to detect a second speed of a second element coupled to the gearbox, the second speed sensor positioned on an output side of the gearbox;

detect a trigger event based on the data from the first speed sensor and the data from the second speed sensor, the trigger event comprising a divergence between the first speed and the second speed that is indicative of an overspeed condition of the gas turbine engine; and upon detecting the trigger event, communicate a command to an engine operational system to operate a valve that dumps compressor discharge air pressure or to operate a variable turbine inlet vane to control air flow to a turbine of the gas turbine engine.

9. The control system of claim 8, wherein the first element is an input shaft coupled to the gearbox or a component coupled thereto, and wherein the second element is an output shaft of the gearbox or a component coupled thereto.

10. The control system of claim 9, wherein the input shaft is a high-speed shaft, and wherein the output shaft is a low-speed shaft.

11. The control system of claim 8, wherein the trigger event is at least one of:

exceeding a threshold difference between the first speed and the second speed; or exceeding a threshold rate of change between the first speed and the second speed.

12. The control system of claim 8, wherein the command is configured to stop the gas turbine engine.

13. A method, comprising:

sensing a first speed of a first element from a first speed sensor positioned on an input side of a gearbox in an engine;

receiving data on a second speed of a second element from a second speed sensor positioned on an output side of the gearbox;

detecting a trigger event based on the first speed and the second speed, the trigger event comprising a divergence between the first speed and the second speed that is indicative of an overspeed condition of the engine; and upon detecting the trigger event, communicating a command to an engine operational system to operate a valve that dumps compressor discharge air pressure, or to operate a variable turbine inlet vane to control air flow to a turbine of the engine.

14. The method of claim 13, wherein the first element is an input shaft of the gearbox or a component coupled thereto, and wherein the second element is an output shaft of the gearbox or a component coupled thereto.

15. The method of claim 13, wherein the command is configured to stop the engine.

16. The method of claim 13, further comprising:

determining a relationship between the first speed and the second speed; and detecting the trigger event upon the relationship exceeding a threshold.

17. The method of claim 13, further comprising: determining a rate of change of the first speed; determining a rate of change of the second speed;

determining a relationship between the rate of change of the first speed and the rate of change of the second speed; and detecting the trigger event upon the relationship exceeding a threshold.

18. The method of claim 13, further comprising:

determining a relationship between the first speed and the second speed;

determining a rate of change in the relationship; and detecting the trigger event upon the rate of change in the relationship exceeding a threshold.

19. The method of claim 13, further comprising: determining a rate of change of the first speed; determining a rate of change of the second speed;

determining a relationship between the rate of change of the first speed and the rate of change of the second speed;

determining a rate of change of the relationship; and detecting the trigger event upon the rate of change of the relationship exceeding a threshold.

20. The method of claim 13, further comprising determining a known relationship between the first speed and the second speed based on a reduction ratio of the gearbox, wherein detecting the trigger event comprises detecting the trigger event upon the divergence exceeding a threshold based on the known relationship.

* * * * *